US010167795B2

(12) United States Patent
Disaro' et al.

(10) Patent No.: US 10,167,795 B2
(45) Date of Patent: Jan. 1, 2019

(54) EXHAUST GAS TREATMENT SYSTEM WARM-UP METHODS

(71) Applicant: GM GLOBAL TECHNOLOGY OPERATIONS LLC, Detroit, MI (US)

(72) Inventors: Lorenzo Disaro', Vimercate (IT); Roberto Romanato, Settimo Torinese (IT)

(*) Notice: Subject to any disclaimer, the term of this patent is extended or adjusted under 35 U.S.C. 154(b) by 0 days.

(21) Appl. No.: 15/479,603

(22) Filed: Apr. 5, 2017

(65) Prior Publication Data
US 2018/0291827 A1 Oct. 11, 2018

(51) Int. Cl.
*F01N 3/00* (2006.01)
*F02D 41/02* (2006.01)
*F01N 3/20* (2006.01)
*F02B 37/18* (2006.01)
*F02D 41/00* (2006.01)

(52) U.S. Cl.
CPC ....... *F02D 41/0255* (2013.01); *F01N 3/2013* (2013.01); *F01N 3/2066* (2013.01); *F02B 37/18* (2013.01); *F02D 41/0007* (2013.01); *F02D 2200/50* (2013.01)

(58) Field of Classification Search
USPC ......... 60/274, 278, 280, 286, 289, 291, 292, 60/293, 295, 299, 300, 303
See application file for complete search history.

(56) References Cited

U.S. PATENT DOCUMENTS

| | | | | |
|---|---|---|---|---|
| 6,568,173 B1* | 5/2003 | Kolmanovsky | ......... | F01N 3/023 60/274 |
| 7,104,051 B2* | 9/2006 | Shimasaki | ............ | F01N 3/0253 60/274 |
| 7,316,157 B2* | 1/2008 | Ohsaki | .................. | F01N 11/002 73/114.69 |
| 8,099,953 B2* | 1/2012 | DeHart | ..................... | F01N 3/05 60/295 |
| 9,146,210 B2* | 9/2015 | Gibson | ............. | G01N 27/4067 |
| 2011/0225955 A1* | 9/2011 | Kimura | ................... | F01N 3/101 60/278 |

* cited by examiner

Primary Examiner — Binh Q Tran

(57) ABSTRACT

Provided are methods for warming up a vehicle exhaust treatment system prior to an engine start, wherein the vehicle includes an internal combustion engine (ICE), a supercharger capable of delivering air to an ICE intake, an exhaust gas treatment system including an exhaust gas treatment device and an upstream electric heating device and capable of accepting exhaust gas from the ICE, and optionally a turbocharger having a turbine in fluid communication with the exhaust gas treatment system. Methods include establishing fluid communication between the supercharger and the exhaust gas treatment system, engaging the supercharger to communicate air to the exhaust gas treatment system via the supercharger, and engaging the heating device. The method can further comprise reducing turbine resistance by reducing the power position of the turbine or opening a wastegate. The methods can further include first satisfying a start condition, and/or subsequently detecting a termination condition.

20 Claims, 2 Drawing Sheets

EXHAUST GAS TREATMENT SYSTEM WARM-UP METHODS

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons, oxides of nitrogen ($NO_x$), and oxides of sulfur (SOx), as well as condensed phase materials (liquids and solids) that constitute particulate matter. Liquids can include water and hydrocarbons, for example.

Exhaust gas treatment systems may employ catalysts in one or more components configured for accomplishing an after-treatment process. One type of exhaust treatment technology for reducing $NO_x$ emissions is a selective catalytic reduction (SCR) device, which generally includes a substrate or support with a catalyst compound disposed thereon. Passing exhaust over the catalyst converts certain or all exhaust constituents in desired compounds, such as non-regulated and/or non-polluting exhaust gas components. Specifically, the SCR device can reduce $NO_x$ to produce more tolerable exhaust constituents of nitrogen ($N_2$) and water ($H_2O$). Another type of exhaust treatment device is an oxidation catalyst (OC) device, which is commonly positioned upstream from a SCR device to serve several catalytic functions. In particular, OC devices convert NO into $NO_2$ to alter the $NO:NO_x$ ratio in order to increase the $NO_x$ reduction efficiency of the downstream SCR device. SCR devices and OC devices, among others, typically have a "light-off" temperature, below which the device is not catalytically active or efficient, and/or does not function as desired.

SUMMARY

According to an aspect of an exemplary embodiment, a method for warming up a vehicle exhaust treatment system prior to an engine start is provided, wherein the vehicle includes an internal combustion engine (ICE), a supercharger capable of delivering air to an ICE intake, and an exhaust gas treatment system including an exhaust gas treatment device and an upstream electric heating device and capable of accepting exhaust gas from the ICE. The method can include establishing fluid communication between the supercharger and the exhaust gas treatment system, engaging the supercharger to communicate air to the exhaust gas treatment system via the supercharger, and engaging the upstream electric heating device. Establishing fluid communication between the supercharger and the exhaust gas treatment system can include opening one or more of an exhaust gas recirculation valve and a throttle valve. The exhaust gas treatment device can include one or more of an oxidation catalyst device, a selective catalytic reduction device, a selective catalytic reduction filter device, and a particulate filter device. The exhaust gas treatment device can include an oxidation catalyst device, and the upstream electric heating device can be incorporated in the oxidation catalyst device. The exhaust gas treatment can further include a selective catalytic reduction device downstream from the oxidation catalyst device.

The method can further include satisfying a start condition prior to one or more of establishing fluid communication between the supercharger and the exhaust gas treatment device, engaging the supercharge to communicate air to the exhaust gas treatment system via the supercharger, and engaging the upstream electric heating device. A start condition can include one or more of a vehicle door opening event, a driver seat sensor event, a seat belt sensor event, a fob proximity detection, and a remote start command. The method can further include subsequently detecting a termination condition and one or more of disengaging the supercharger, disengaging the upstream electric heating device, and restricting fluid communication between the supercharger and the exhaust gas treatment system. A termination condition can include a key-on event, a remote start event, achieving an aftertreatment device target temperature, reaching an exhaust gas treatment system warming duration, a minimum speed threshold, and a battery charge level. The vehicle can include a battery configured to power a starter for the ICE, and one or more of the upstream electric heating device and the supercharger can be powered by the battery. The vehicle can include a first battery configured to start the ICE, and a second battery configured to power one or more of the upstream electric heating device and the supercharger. The vehicle can further include a turbocharger having a turbine upstream from the exhaust gas treatment system and capable of achieving fluid communication with the supercharger, and a compressor in fluid communication with the ICE intake. The method can further include reducing turbine resistance.

According to another aspect of an exemplary embodiment, a method for warming up a vehicle exhaust treatment system prior to an engine start is provided, wherein the vehicle includes an internal combustion engine (ICE), an air communicating device, an exhaust gas treatment system including an exhaust gas treatment device and an upstream electric heating device. The method can include satisfying a start condition, engaging the air communicating device to communicate air to the exhaust gas treatment system, engaging the upstream electric heating device, subsequently detecting a termination condition, and disengaging one or more of the air communicating device and the upstream electric heating device. The start condition can include one or more of a vehicle door opening event, a driver seat sensor event, a seat belt sensor event, a fob proximity detection, and a remote start command. The termination event can include a key-on event, a remote start event, an aftertreatment device target temperature, an exhaust gas treatment system warming duration, a minimum speed threshold, and a battery charge level. The exhaust gas treatment device can include an oxidation catalyst device, and the upstream electric heating device can be incorporated in the oxidation catalyst device. The vehicle can further include a turbocharger having a turbine upstream from the exhaust gas treatment system, and the method can further include reducing turbine resistance prior to detecting a termination condition.

Although many of the embodiments herein are described in relation to warming exhaust gas treatment systems for vehicles powered by ICEs, the embodiments herein are generally suitable for warming any exhaust gas treatment system.

Other objects, advantages and novel features of the exemplary embodiments will become more apparent from the following detailed description of exemplary embodiments and the accompanying drawings.

DETAILED DESCRIPTION

Figure 1:
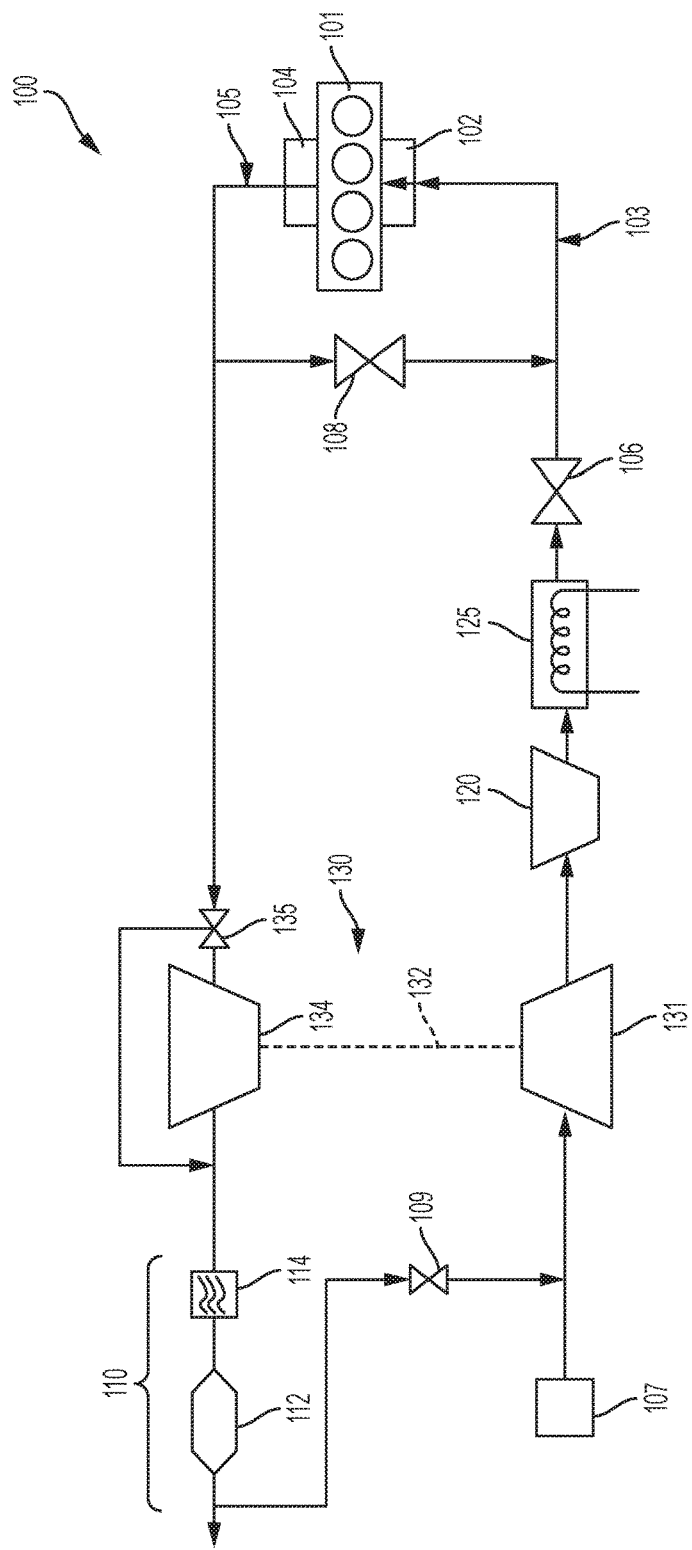
FIG. 1 illustrates a schematic view of an internal combustion engine system, according to one or more embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to methods for warming exhaust gas treatment systems. In particular, this disclosure pertains to methods for warming exhaust gas treatment systems configured to receive and treat exhaust gas provided by an exhaust gas source. In some embodiments, warming can comprise heating an exhaust gas treatment device to achieve or increase the device temperature toward its "light-off" temperature. As used herein, a device "light-off" temperature refers to a temperature at which the device performs its intended purpose suitably. For example, for a catalytic device, a light-off temperature may be the temperature at which the catalytic element becomes active, or is capable of achieving a desired catalytic effect (e.g., catalytic conversion of NO to $NO_2$. The methods herein can be implemented prior to an engine start to reduce or prevent unsuitable exhaust emissions. For example, the methods herein can reduce or prevent $NO_x$ slip.

In some embodiments, the exhaust gas source generating the exhaust gas streams can be an internal combustion engine (ICE). Methods described herein are germane to ICE systems that can include, but are not limited to, diesel engine systems, gasoline direct injection systems, and homogeneous charge compression ignition engine systems. An ICE can include a plurality of reciprocating pistons attached to a crankshaft which may be operably attached to a driveline, such as a vehicle driveline, to power a vehicle (e.g., deliver tractive torque to the driveline). For example, an ICE can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore when reference is made to a vehicle, such disclosure should be interpreted as applicable to any application of an ICE.

Moreover, an ICE can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE can also generally represent any device capable of generating an effluent stream comprising such species. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. Exhaust gas particulate matter generally includes carbonaceous soot, and other solid and/or liquid carbon-containing species which are germane to ICE exhaust gas or form within an exhaust gas treatment system.

FIG. 1 illustrates a schematic view of an ICE system 100, including an ICE 101 configured to receive air 103, for example via an air intake 102, and expel exhaust gas 105, for example via an exhaust manifold 104. Air 103 intake can be controlled by a throttle valve 106 which can facilitate or deny fluid communication between ICE 101 and an air source 107. Air source 107 is the ambient, in many embodiments. Some ICEs utilize exhaust gas recirculation (EGR) strategies by reintroducing exhaust gas into ICE. Recirculated ECGR gas mixes typically mixes with air prior to being introduced into an ICE. EGR strategies can dilute the oxygen content of ICE intake air, and/or dilute the pollutant concentration or flow rate in exhaust gas, for example. EGR strategies can increase the efficiency in spark ignition engines, and/or reduce the combustion temperature and NOx production from an ICE, for example. System 100 can include one or more of a high pressure EGR capability and a low pressure EGR capability. As shown, exhaust gas 105 can be reintroduced to ICE 101 via a high pressure EGR valve 108. High pressure EGR valve 108 is generally disposed immediately downstream the ICE 101 exhaust manifold 104, and generally upstream from turbocharger 130 turbine 134. Additionally or alternatively, exhaust gas 105 can be reintroduced to ICE 101 via a low pressure EGR valve 109. Low pressure EGR valve 109 is generally disposed downstream from the one or more exhaust gas treatment devices 112. Low pressure EGR valve 109 in some embodiments can comprise an additional valve for increasing the pressure of exhaust gas 105. As shown, low pressure EGR valve 109 introduced exhaust gas upstream from turbocharger 130 compressor 131, however other orientations which introduce recirculated exhaust gas 105 upstream from ICE 101 intake 102 are similarly suitable. Both high and low pressure EGR gas can mix with air 103 prior to or at intake 102. EGR gas 109 can comprise the exhaust gas of a single or plurality of ICE 101 cylinders.

ICE 101 is in fluid communication with exhaust gas treatment system 110, for example via an exhaust gas conduit. System 110 is configured to one or more of receive, monitor, and treat exhaust gas 105. System 110 generally includes one or a plurality of exhaust gas treatment devices 112. In some embodiments, an exhaust gas treatment device 112 can comprise an oxidation catalyst (OC) device, a selective catalytic reduction (SCR) device, a selective catalytic reduction filter (SCRF) device, a particulate filter (PF) device, among others.

In general, SCR devices include all devices which utilize a reductant and a catalyst to convert $NO_x$ species (e.g., NO and $NO_2$) to harmless components. A SCR device can include, for example, a flow-through ceramic or metal monolith substrate that can be packaged in a shell or canister having an inlet and an outlet in fluid communication with the exhaust gas conduit and optionally other exhaust treatment devices. The shell or canister can ideally comprise a substantially inert material, relative to the exhaust gas constituents, such as stainless steel. The substrate can include a SCR catalyst composition applied thereto.

A SCR device substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can be a PF device, as will be discussed below.

A SCR catalyst composition is generally a porous and high surface area material which can operate efficiently to convert $NO_x$ constituents in the exhaust gas 105 in the presence of a reductant, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with PF devices or when incorporated into SCRF devices, described below, which are regenerated via high temperature exhaust soot burning techniques. A SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

A SCR device generally uses a reductant to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant can be ammonia ($NH_3$), such as anhydrous ammonia or aqueous ammonia, or generated from a nitrogen and hydrogen rich substance such as urea ($CO(NH_2)_2$). Additionally or alternatively, the reductant can be any compound capable of decomposing or reacting in the presence of exhaust gas and/or heat to form ammonia. SCR catalysts have light-off temperatures below which the catalytic element has low or unsuitable $NO_x$ storage and/or conversion capabilities. For example, many SCR $NO_x$ reduction catalysts can have light-off temperatures of about 150° C. to about 200° C. When a SCR device operates at a temperature below its light-off temperature, undesired $NO_x$ slip can occur wherein $NO_x$ passes through the SCR device unreacted or unstored. $NO_x$ slip can be particularly problematic immediately after engine startup and in cold conditions.

In general, OC devices include all devices which utilize an oxidizing catalyst to oxidize various exhaust gas species (e.g., $NO_x$ and CO). In particular, OC devices convert NO into $NO_2$, in order to optimize the exhaust gas $NO:NO_2$ ratio for downstream SCR and/or SCRF devices which generally operate more efficiently with exhaust gas feed streams having a $NO:NO_2$ ratio of about 1:1. OC devices can additionally or alternatively be utilized to oxidize hydrocarbon species (e.g., uncombusted fuel) for various purposes such as after-injection regeneration strategies. After-injection regeneration strategies manipulate engine calibrations such that fuel after-injected into the engine cylinders is expelled into the exhaust system uncombusted. When the after-injected fuel contacts the OC device, heat released during oxidation of the fuel is imparted to the exhaust gas treatment system and can aid in regenating various treatment devices such as SCRF devices and PF devices. Accordingly, in many embodiments, OC devices are disposed upstream from SCR devices, and SCRF devices, and PF devices. OC devices can have light-off temperatures of about 150° C. to about 200° C. For example, some OC devices can only effect a 50% conversion of desired species at 150° C.

An OC device can include a flow-through metal or ceramic monolith substrate packaged in shell or canister. The shell or canister includes an inlet and an outlet in fluid communication with exhaust gas, and can ideally comprise a substantially inert material, relative to the exhaust gas constituents, such as stainless steel. The substrate can include an oxidation catalyst compound disposed thereon. The oxidation catalyst compound can be applied as a wash coat and can contain platinum group metals such as platinum (Pt), palladium (Pd), rhodium (Rh) or other metal oxide catalysts, and combinations thereof. Metal oxide catalyst can include iron oxides, zinc oxides, perovksites, and combination thereof, for example.

A PF device generally operates to filter exhaust gas of carbon, soot, and other particulates. A PF device can include a filter, such as a ceramic or SiC wall flow monolith filter, wound or packed fiber filters, open cell foams, sintered metal fibers, etc. The filter can be packaged in a shell or canister having an inlet and an outlet in fluid communication with exhaust gas. The shell or canister can ideally comprise a substantially inert material, relative to the exhaust gas constituents, such as stainless steel. A monolith filter can have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas entering the filter through the inlet ends of the inlet passages the former subset is forced to migrate through adjacent longitudinally extending walls to the outlet passages of the latter subset. A SCRF device combines the features of SCR devices and PF devices into a single device by coating a PF filter with an active catalytic component, such as the SCR catalytic components described above. The catalytic component can be applied as a washcoat to the inner walls of inlet passages of a monolith filter, for example.

Exhaust gas treatment system 110 further comprises an upstream electric heating device 114. In some embodiments, exhaust gas treatment system 110 further comprises a plurality of upstream electric heating devices 114. A plurality of upstream electric heating devices 114 can be utilized when several exhaust gas 105 paths from ICE 101 and system 110 are present. Upstream electric heating device 114 can be powered by a battery, for example. In some embodiments, a vehicle comprises a battery configured to power a starter for the ICE 101 and the upstream electric heating device 114. An "upstream" electric heating device is one which is either disposed upstream from a treatment device (e.g., treatment device 112) or is incorporated into the upstream side of a treatment device. The electric heating device is generally used to increase the temperature of an exhaust gas treatment device, such as device 112. In particular, the electric heating device can be used to increase the temperature of the catalytic element of an exhaust gas treatment device. For example, an electric oxidation catalyst (eOC) device can include a substrate with catalytic elements disposed thereon, as described above, and an electric heating device. The electric heating device can be connected to an electric power source for providing power thereto, and can be selectively activated to heat the substrate and/or the catalytic elements thereon.

System 100 further comprises a supercharger 120. In general, a supercharger is configured to compress air and deliver the same to an ICE. A supercharger increases the air density within an ICE cylinder and increases fuel combustion potential in order to optimize or maximize engine efficiency and/or output. Superchargers generally comprise one or more rotors or compressor wheels disposed within a housing, the former in fluid communication with an air intake and outlet defined by the housing. Air provided to the one or more rotors or compressor wheels via the air intake is compressed via the one or more rotors or compressor wheels and communicated through the air outlet. All superchargers as disclosed herein are at least partially electric, or, in other words, they are powered at least in part by an electric source such as a battery. In some embodiments, the supercharger(s) can be fully electric. In some embodiments, it is practicable for a supercharger to be selectively and/or simultaneously powered by an electric power source (e.g., a battery) and a non-electric power source (e.g., an ICE.)

Referring to FIG. 1, an air intake of supercharger 120 is in fluid communication with air source 107, and an air outlet of supercharger 120 is in fluid communication with ICE 101 (e.g., via air intake 102). Air compressed within a supercharger increases in temperature, and in some embodiments an intercooler 125 is optionally disposed downstream of the supercharger 120 and configured to cool the compressed air prior to its introduction to ICE 101. Supercharger 120 can be powered by an electric motor which is appurtenant only to supercharger 120. In other embodiments, supercharger 120 can be powered by an electric motor which is configured to power additional vehicular aspects, such as a vehicle drivetrain in a hybrid vehicle. The electric motor can be powered by a battery, for example. In some embodiments, a vehicle comprises a battery configured to power a starter for the ICE 101 and the supercharger 120. In some embodiments, a vehicle comprises a battery configured to power a starter for the ICE 101, the upstream electric heating device 114, and the supercharger 120. In some embodiments, the vehicle can include a first battery configured to start the ICE 101, and a second battery configured to power one or more of the upstream electric heating device 114 and the supercharger 120.

System 100 can optionally include a turbocharger 130. In some embodiments, system 100 includes a plurality of turbochargers. A plurality of turbochargers can be configured in series, in parallel, or both, for example. Turbocharger 130 includes a compressor 131 having an upstream side in fluid communication with the air source 107 and a downstream side in fluid communication with one or more of the throttle valve 106, ICE 101 (e.g., via air intake 102), and optionally the intercooler 125. Compressor 131 is operatively connected to turbine 134, such as via a common shaft 132, having an upstream side in fluid communication with ICE 101 (e.g., via exhaust manifold 104), and a downstream side in fluid communication with exhaust gas treatment system 110. Exhaust gas 105 communicated from ICE exhaust manifold 104 transfers kinetic and/or thermal energy to turbine 134, which subsequently transfers kinetic energy to compressor 131, such as via the common shaft 132. Air 103 provided to compressor 131 is compressed and communicated to ICE 101 (e.g., via air intake 102). Compressor 131 and supercharger 120 are illustrated in series, however the same may be configured in parallel, or other configurations which allow for fluid communications between compressor 131 and ICE 101 and supercharger 120 and ICE 101. Intercooler 125 may be common to compressor 131 and supercharger 120, or may be appurtenant only to compressor 131 or supercharger 120.

Turbocharger 130 can further comprise a bypass valve 135 for diverting exhaust gas 105 away from turbine 134 towards exhaust gas treatment system 110. Bypass valve 135 is commonly used to limit boost pressure exerted by compressor 131 by limiting the power output of turbine 134, for example. Bypass valve 135 is in some embodiments incorporated in a housing appurtenant to turbine 134, and can be referred to as a wastegate. Turbochargers which include wastegates are typically fixed turbine turbochargers. In some embodiments, common shaft 132 of turbocharger 130 can be driven by an electric motor (not shown) which can power the turbine 134. Accordingly, in such embodiments, turbine 134 can be powered by the electric motor and can be used in addition with, or as an alternative to, supercharger 120 to provide air to the exhaust gas treatment system, as will be described below.

In some embodiments, turbocharger 130 comprises a variable turbine turbocharger. A variable turbine turbocharger can include variable geometry turbine and variable area turbines, as known in the art. Variable geometry turbines include pivoting vein, moving wall, and sliding ring designs, among others. In general, a variable turbine turbocharger is able to increase or decrease the amount of power produced by the turbine by manipulating one or more physical characteristics of the turbine and/or appurtenant components. Each variable turbine turbocharger includes a maximum power position and a minimum power position, whereat a turbine will generate a maximum amount of power or a minimum amount of power, respectively, for a given amount of exhaust air received by the turbine.

Figure 2:
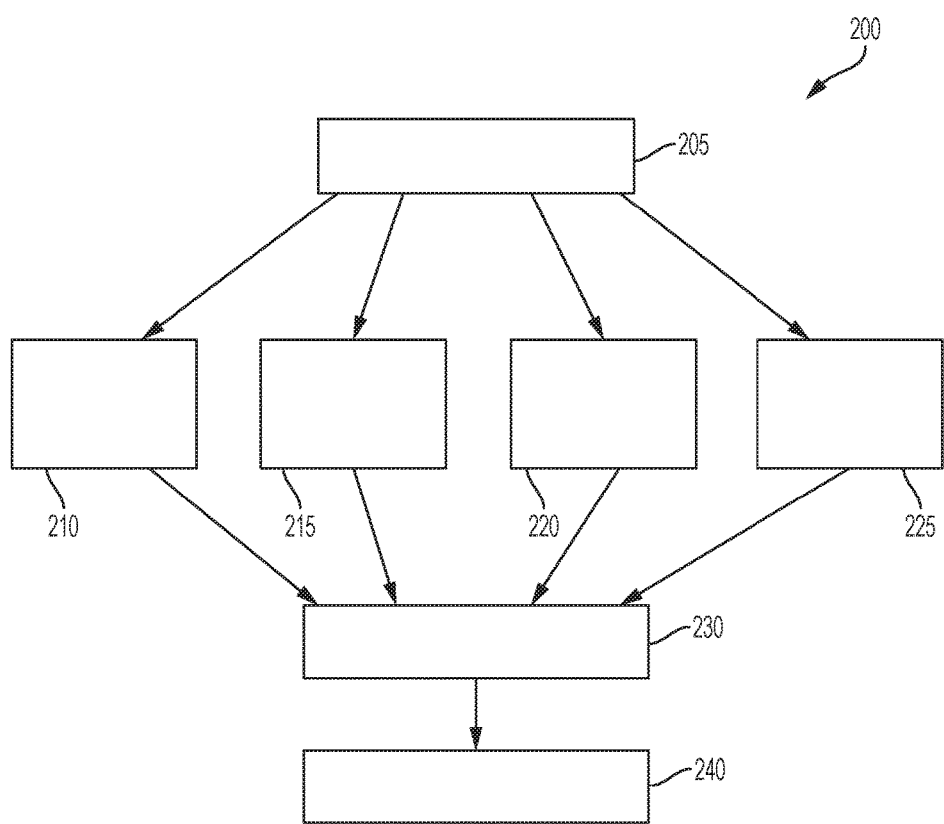
FIG. 2 illustrates a block diagram of a method for warming up a vehicle exhaust treatment system, according to one or more embodiments.

Typically exhaust gas treatment devices rely on heat provided by an ICE (e.g., via exhaust gas, or other thermal management systems) to achieve light-off temperatures. Accordingly, during early cycle operation (e.g., immediately after ICE 101 start) of ICE systems, such as system 100, and/or in other operating conditions where one or more exhaust gas treatment devices 112 are below their light-off temperatures, exhaust gas 105 is not suitably treated prior to expulsion from exhaust gas treatment system 110 (e.g., such as via a vehicle tailpipe). FIG. 2 illustrates a block diagram illustrating a method 200 for warming up a vehicle exhaust treatment system prior to an ICE start. Method 200 allows exhaust gas treatment devices, particularly catalyst-based devices, to be warmed prior to an ICE start. Method 200 will be described in relation to system 100 for the sake of clarity and illustration only, and method 200 is not to be construed as limited by the orientation and/or elements of system 100.

Method 200 comprises establishing fluid communication 210 between the supercharger 120 and the exhaust gas treatment system 110, engaging the supercharger 215 to communicate air (e.g., air 103 provided by air source 107) to the exhaust gas treatment system 110 via the supercharger 120, and engaging the upstream electric heating device 220. No order is imposed between establishing fluid communication 210, engaging the supercharger 215, and engaging the upstream electric heating device 220. Establishing fluid communication 210 between the supercharger 120 and the exhaust gas treatment system 110 can comprise one or more of opening the high pressure EGR valve 108 and opening the throttle valve 106. Establishing fluid communication 210 between the supercharger 120 and the exhaust gas treatment system 110 can further comprise opening a low pressure EGR valve 109.

Communicating air 103 via the supercharger 120 to the exhaust gas treatment system 110 allows heat generated by the electric heating device 114 to be distributed more evenly throughout exhaust gas treatment device 112. In embodiments where exhaust gas treatment system 110 comprises a plurality of exhaust gas treatment devices 112, communicating air 103 via the supercharger 120 to the exhaust gas treatment system 110 allows heat generated by the electric heating device 114 to be distributed to some or all of the plurality of exhaust gas treatment devices 112. As described above, exhaust gas treatment devices 112 can include one or more of an OC device, a SCR device, a SCRF device, and a PF device. In a specific embodiment, exhaust gas treatment system comprises at least two exhaust gas treatment devices, including an OC device and a SCR device or SCRF device disposed downstream from the OC device. As described above, the upstream electric heating device 114 can comprise a separate, upstream heating device. In some embodiments, the electric heating device 114 is incorporated in an exhaust gas treatment device 112. In a specific embodiment, an exhaust gas treatment device 112 comprise an eOC device. In some instances, method 200 can obviate the need for an integrated heater, such as an eOC device.

In some embodiments where system 100 includes a turbocharger 130 having a turbine disposed upstream from the one or more exhaust gas treatment devices 112 and/or the electric heating device 114, air communicated via the supercharger can impart (i.e., lose) kinetic and/or thermal energy to the turbine 134. Accordingly, method 200 can further comprise reducing 225 turbine 134 resistance. Establishing fluid communication 210, engaging the supercharger 215, engaging the upstream electric heating device 220, and reducing 225 turbine 134 resistance can comprise "warming protocol", and no order is imposed therebetween. Reducing 225 turbine 134 resistance can comprise utilizing a bypass valve 135 to partially or completely route exhaust gas 105 around turbine 134 toward exhaust gas treatment system 110. In some embodiments, turbocharger 130 comprises a fixed-geometry turbocharger and bypass valve 135 comprises a wastegate. In some embodiments, turbocharger comprises a variable turbine turbocharger, and reducing turbine resistance comprises decreasing a power position of a turbine toward a minimum power position, and accordingly away from a maximum power position, by adjusting one or more physical characteristics of the turbine and/or appurtenant components. In some embodiments, the one more exhaust gas treatment devices 112 can be close-coupled to the turbocharger 130. A close-coupled device can be within 1 meter of the turbocharger turbine outlet, for example, wherein the distance is measured based upon the linear length of exhaust gas conduit between the turbocharger turbine and the one or more exhaust gas treatment devices 112.

Method 200 can further comprise satisfying a start condition 205 prior to one or more of establishing fluid communication 210 between the supercharger and the exhaust gas treatment device, engaging the supercharger 215 to communicate air to the exhaust gas treatment system via the supercharger, engaging the upstream electric heating device 220, and optionally reducing 225 turbine 134 resistance. A start condition can generally include conditions or events which indicate that a vehicle ICE will be started momentarily, and can trigger method 200 to allow for the vehicle exhaust gas treatment system to be warmed prior to an ICE start. A start condition can comprise one or more of a vehicle door (e.g., vehicle trunk, vehicle driver door, vehicle passenger door) opening event, a driver seat sensor event, a seat belt (e.g., driver seat belt, passenger seat belt) sensor event, a fob proximity detection, and a remote start command. A fob can comprise a key fob, a cellular telephone, or other device capable of communicating proximity to the vehicle. If a vehicle receives a remote start command, for example via a key fob, cellular telephone, or other means, a remote start can be delayed to allow execution of method 200.

Method 200 can further comprise detecting a termination condition 230 subsequent to one or more of establishing fluid communication 210, engaging the supercharger 215, engaging the upstream electric heating device 220, and optionally reducing 225 turbine 134 resistance. Method 200 can further comprise terminating 240 one or more warming protocol subsequent to detecting 230 a termination condition. A termination condition can generally include conditions or events which indicate that an ICE start is imminent, the exhaust gas treatment system has been sufficiently warmed, or that continued warming of the exhaust gas treatment system is not desired. A termination condition can comprise a termination condition comprises a key-on event (e.g., an ICE start), a remote start, an aftertreatment device target temperature, an exhaust gas treatment system warming duration, a minimum speed threshold, and a battery charge level. A remote start can occur subsequent to a delayed remote start command in order to allow for one or more of establishing fluid communication 210, engaging the supercharger 215, engaging the upstream electric heating device 220, and optionally reducing 225 turbine 134 resistance. For hybrids vehicles powered by both electric and ICE means, a termination condition need not necessarily comprise be a key-on event, because the vehicle can initial drive solely via electric power (i.e., not via power contributed by an ICE). Further, some hybrid vehicles it is desirable to power the vehicle at least in part by the ICE for speeds over a threshold (e.g., above 50 miles per hour). Accordingly, for hybrid vehicles, in some embodiments a termination condition can comprise one or more of an aftertreatment device target temperature, an exhaust gas treatment system warming duration, a minimum speed threshold, and a battery charge level.

As described above, a remote start can be delayed to allow execution of method 200, however in some embodiments, once one or more warming protocol have been initiated, a remote start event can terminate some or all initiated warming protocol. An aftertreatment device target temperature can comprise a device light-off temperature, for example. In particular, an aftertreatment device target temperature can comprise an OC device light-off temperature, or a SCR device light-off temperature. An exhaust gas treatment system warming duration can comprise a recalibrated duration considerate of exhaust gas treatment system 110 warming characteristics, or the characteristics of a battery which powers one or more of a starter for the ICE 101, the upstream electric heating device 114, and the supercharger 120. In one example, an eOC device can be sufficiently warmed in about 15 seconds. A battery charge level can comprise the charge level of a battery configured to power a starter for the ICE 101 and one or more of the upstream electric heating device 114 and the supercharger 120. Such a charge level can be determined in order to ensure the battery maintains sufficient charge to start the ICE 101.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for warming up a vehicle exhaust treatment system prior to an engine start, wherein the vehicle includes an internal combustion engine (ICE), a supercharger capable of delivering air from an upstream side to an ICE air intake, an exhaust gas treatment system configured to accept exhaust gas from an ICE exhaust manifold and including an exhaust gas treatment device and an electric heating device disposed upstream from the exhaust gas treatment device, and a high pressure exhaust gas recirculation (HPEGR) valve capable of controlling fluid communication between a first position downstream from the ICE exhaust manifold and upstream from the electric heating device and a second position downstream from the supercharger and upstream from the ICE air intake, the method comprising:
   establishing fluid communication between the supercharger and the exhaust gas treatment system via the HPEGR valve;
   engaging the supercharger to communicate air to the exhaust gas treatment system via the HPEGR valve; and
   engaging the upstream electric heating device such that heat generated by the electric heating device is distributed to the exhaust gas treatment system.

2. The method of claim 1, wherein the exhaust gas treatment device comprises an oxidation catalyst device, and the upstream electric heating device is incorporated in the oxidation catalyst device.

3. The method of claim 1, further comprising satisfying a start condition prior to one or more of establishing fluid communication between the supercharger and the exhaust gas treatment device via the HPEGR valve, engaging the supercharge to communicate air to the exhaust gas treatment system via the supercharger, and engaging the upstream electric heating device.

4. The method of claim 3, wherein a start condition comprises one or more of a vehicle door opening event, a driver seat sensor event, a seat belt sensor event, a fob proximity detection, and a remote start command.

5. The method of claim 1, further comprising subsequently detecting a termination condition and one or more of disengaging the supercharger, disengaging the upstream electric heating device, and restricting fluid communication between the supercharger and the exhaust gas treatment system via the HPEGR valve.

6. The method of claim 5, wherein a termination condition comprises a key-on event, a remote start event, achieving an aftertreatment device target temperature, reaching an exhaust gas treatment system warming duration, a minimum speed threshold, and a battery charge level.

7. The method of claim 1, wherein the vehicle comprises a throttle valve capable of controlling fluid communication between a fifth position downstream from the supercharger and upstream from the second position, and establishing fluid communication between the supercharger and the exhaust gas treatment system further comprises opening the throttle valve.

8. The method of claim 1, wherein the vehicle comprises a battery configured to power a starter for the ICE, and one or more of the upstream electric heating device and the supercharger is powered by the battery.

9. The method of claim 1, wherein the vehicle comprises a first battery configured to start the ICE, and a second battery configured to power one or more of the upstream electric heating device and the supercharger.

10. The method of claim 1, wherein the vehicle further comprises a turbocharger including a turbine disposed upstream from the exhaust gas treatment system and downstream from the first position and capable of achieving fluid communication with the supercharger via the HP EGR valve, and a compressor in fluid communication with the ICE air intake.

11. The method of claim 10, further comprising reducing turbine resistance.

12. The method of claim 11, wherein the turbocharger comprises a variable turbine turbocharger, and reducing the turbine resistance comprises decreasing a power position of the turbocharger.

13. The method of claim 11, wherein the turbine comprises a wastegate, and reducing the turbine resistance comprises opening the wastegate.

14. A method for warming up a vehicle exhaust treatment system prior to an engine start, wherein the vehicle includes an internal combustion engine (ICE), an air communicating device disposed upstream from an ICE air intake, an exhaust gas treatment system configured to accept exhaust gas from an ICE exhaust manifold and including an exhaust gas treatment device and an electric heating device disposed upstream from the exhaust gas treatment device, and a high pressure exhaust gas recirculation (HPEGR) valve capable of controlling fluid communication between a first position downstream from the ICE exhaust manifold and upstream from the electric heating device and a second position downstream from the air communicating device and upstream from the ICE air intake, the method comprising:

satisfying a start condition;

subsequently:

engaging the air communicating device to communicate air to the exhaust gas treatment system via the HPEGR valve, and engaging the upstream electric heating device such that heat generated by the electric heating device is distributed to the exhaust gas treatment system;

subsequently detecting a termination condition; and subsequently disengaging one or more of the air communicating device and the upstream electric heating device.

15. The method of claim 14, wherein a start condition comprises one or more of a vehicle door opening event, a driver seat sensor event, a seat belt sensor event, a fob proximity detection, and a remote start command.

16. The method of claim 14, wherein a termination condition comprises a key-on event, a remote start event, an aftertreatment device target temperature, an exhaust gas treatment system warming duration, a minimum speed threshold, and a battery charge level.

17. The method of claim 14, wherein the exhaust gas treatment device comprises an oxidation catalyst device, and the upstream electric heating device is incorporated in the oxidation catalyst device.

18. The method of claim 14, wherein the vehicle further comprises a turbocharger including a turbine disposed upstream from the exhaust gas treatment system and downstream from the first position and capable of achieving fluid communication with the air communicating device via the HP EGR valve, and the method further comprises reducing turbine resistance prior to detecting a termination condition.

19. The method of claim 1, wherein the vehicle further comprises a low pressure exhaust gas recirculation (LPEGR) valve capable of controlling fluid communication between a third position downstream from the exhaust gas treatment device and a fourth position upstream from the supercharger, and the method further comprises establishing fluid communication between a third position downstream from the exhaust gas treatment device and a fourth position upstream from the supercharger via the LPEGR valve.

20. The method of claim 14, wherein the vehicle further comprises a low pressure exhaust gas recirculation (LPEGR) valve capable of controlling fluid communication between a third position downstream from the exhaust gas treatment device and a fourth position upstream from the supercharger, and the method further comprises, subsequent to satisfying a start condition and prior to detecting a termination condition, establishing fluid communication between a third position downstream from the exhaust gas treatment device and a fourth position upstream from the supercharger via the LPEGR valve.

\* \* \* \* \*